(12) United States Patent
Hillesheim et al.

(10) Patent No.: US 7,841,358 B2
(45) Date of Patent: Nov. 30, 2010

(54) MODULAR VALVE SYSTEM

(75) Inventors: Thorsten Hillesheim, Reichshof-Schemmerhausen (DE); Peter Bruck, Althornbach (DE)

(73) Assignee: Hydac Fluidtechnik GmbH, Sulzbaach/Saar (DE)

( * ) Notice: Subject to any disclaimer, the term of this patent is extended or adjusted under 35 U.S.C. 154(b) by 907 days.

(21) Appl. No.: 10/557,841

(22) PCT Filed: Apr. 23, 2004

(86) PCT No.: PCT/EP2004/004306

§ 371 (c)(1),
(2), (4) Date: Jan. 18, 2007

(87) PCT Pub. No.: WO2004/104460

PCT Pub. Date: Dec. 2, 2004

(65) Prior Publication Data

US 2007/0145314 A1    Jun. 28, 2007

(30) Foreign Application Priority Data

May 20, 2003   (DE) ............................... 103 22 585

(51) Int. Cl.
*F16K 31/12* (2006.01)
(52) U.S. Cl. ..................... 137/269; 137/271; 137/454.5
(58) Field of Classification Search .................. 137/269, 137/271, 454.5, 454.2
See application file for complete search history.

(56) References Cited

U.S. PATENT DOCUMENTS

| | | | | |
|---|---|---|---|---|
| 5,063,961 A | * | 11/1991 | Brunner | ................... 137/454.5 |
| 5,375,623 A | * | 12/1994 | Weber | ...................... 137/454.5 |
| 5,400,817 A | | 3/1995 | Voss | |
| 2003/0047216 A1 | | 3/2003 | Kelly | |

FOREIGN PATENT DOCUMENTS

| | | |
|---|---|---|
| DE | 37 17 185 A1 | 12/1988 |
| DE | 39 29 094 A1 | 4/1991 |
| DE | 43 02 080 C1 | 8/1994 |
| DE | 44 02 633 A1 | 8/1995 |
| DE | 101 05 747 A1 | 8/2002 |
| DE | 101 51 808 A1 | 10/2002 |

* cited by examiner

*Primary Examiner*—Kevin L Lee
(74) *Attorney, Agent, or Firm*—Roylance, Abrams, Berdo & Goodman LLP

(57) ABSTRACT

A modular valve system includes at least one valve housing (40) having standard rate quantities on its opposite ends (38, 42), both on the inner peripheral side and on the outer peripheral side and inside the housing (52). Modular valve components, such as a valve piston (46), at least one energy accumulator (26), a pilot-controlled element, and at least one fluidic connection are mounted in the housing. The housing provides for fixing the valve embodied in the form of a screw-in cartridge for connection to other components.

9 Claims, 2 Drawing Sheets

US 7,841,358 B2

MODULAR VALVE SYSTEM

FIELD OF THE INVENTION

The present invention relates to a modular valve system, especially pilot-controlled pressure relief and pressure control valves.

BACKGROUND OF THE INVENTION

Pressure relief valves usually are valves whereby the input pressure is restricted. Its functional element is closed while at rest and opens the output to the container when the reset pressure is reached. This operation occurs as a result of opening in opposition to a closing force of a closing element. In the case of pilot-controlled pressure relief valves, the pressure of the medium selected by a pilot valve is applied to the closing element. As a result, the difference in pressure between beginning and end of opening is very small. Such pilot-controlled pressure relief valves represent the most common protection feature of all-hydraulic systems.

Pressure control valves, also designated as pressure reduction valves, are ones in which the lower output pressure (secondary pressure) is kept constant, while the input pressure (primary pressure) is variable. Such pressure control valves as well may be pilot-controlled and are frequently used for pressure reduction of large fluid flows.

Manually operated pilot valves, as well as electrically operated ones, are used for the referenced pilot control. The electrically actuated valves are actuated by a magnet, usually one in the form of a proportional magnet system. The respective magnets may be provided with emergency pressure actuation and allow manual resetting of the valve if the magnets fail. In addition, switching magnets and proportional magnet systems, with inverted characteristic curves in particular, have been disclosed. That is, an inverse effect is achieved as with a known proportional magnet system. For example, when current does not flow through the proportional magnet, the valve is kept in its closed position (a fail-safe application).

In the known solutions the pressure relief and pressure control valves are still designed individually for each application and adapted to the respective fluid flows to be controlled. This situation results in a multiplicity of valves with a multiplicity of various valve structural components and pilot control elements, in turn resulting in correspondingly high production costs. When a valve is damaged it often must be replaced by a complete new valve. Storage of individual components would be too costly, in view of the large number of structural components employed.

SUMMARY OF THE INVENTION

An object of the present invention is to provide a modular valve system to aid in preventing the disadvantages described, especially in lowering the costs of production and maintenance of valves.

This object is basically attained by a modular valve system having at least one valve housing having opposite ends with standard interior and exterior surfaces and standard interiors. Additional structural valve components, such as a valve piston, at least one energy accumulator, a pilot control element (pilot valve), are mounted in the housing. At least one fluid connection or connection fastens a valve in the form of a screw-in cartridge on other structural components (valve block).

The total valve is constructed on the basis of a standardized valve housing the rated values of which are adapted to predominant fluid flows and fluid amounts. The pilot control element (pilot valve) may be modified, especially as a function of the specific application, so that a manually operated pilot control may be provided for one type of primary valve structural groups, with proportional magnets and without emergency pressure actuation and with or without an inverted characteristic curve and switching pattern. The rated values of the other valve components, such as the valve piston and the energy accumulator (pressure spring) acting on the valve piston, may also be standardized with respect to their values and adapted to the specific valve housing. A small number of structural components, the rated values of which vary with the predominant fluid flows, may be used to control a multiplicity of applications in fluid technology, and especially to build and maintain in modular form the pressure relief valves and pressure control valves frequently required.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
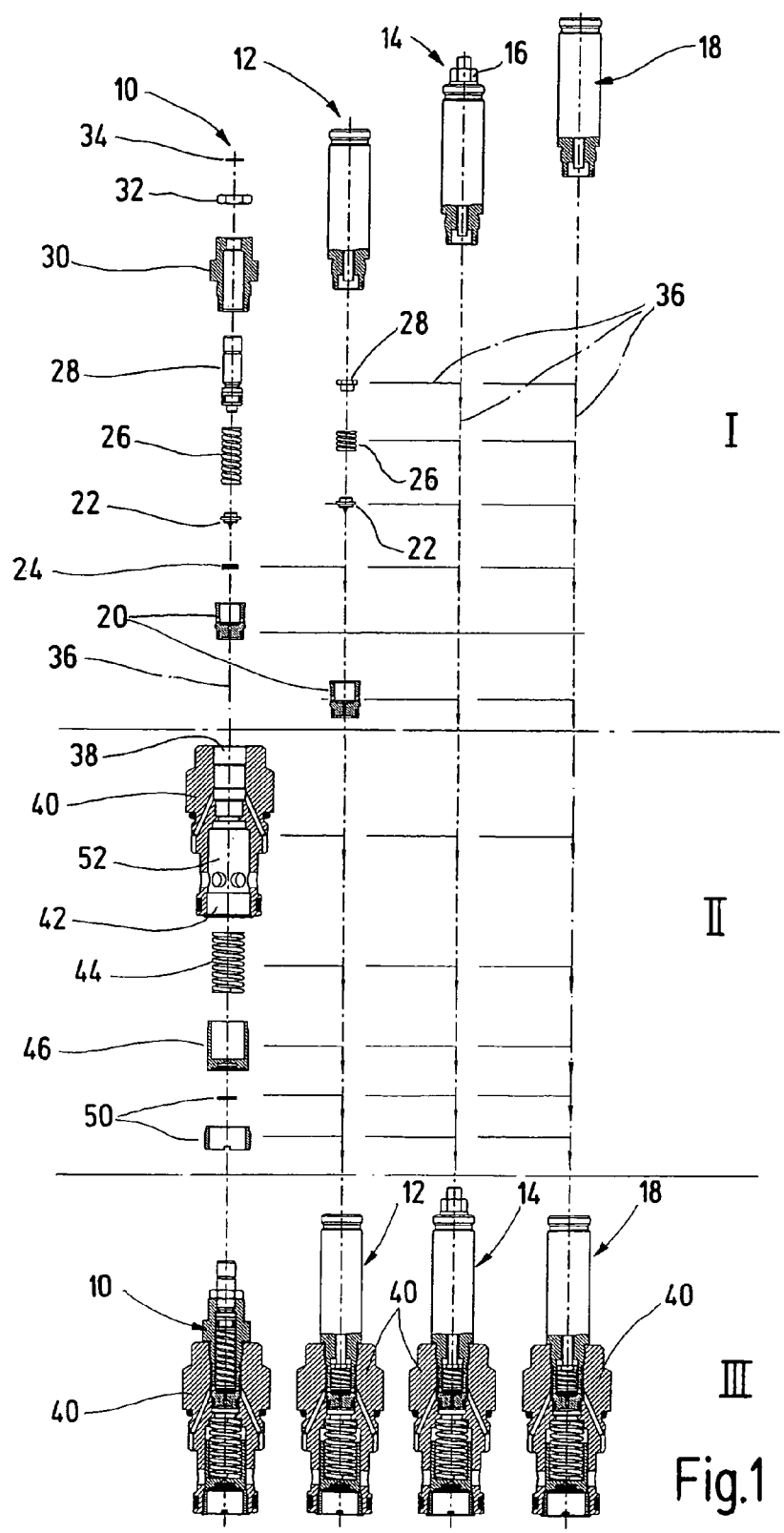
FIG. 1 presents side elevational views in section illustrating four different structures of a pilot-controlled pressure relief valve with pre-assigned rated values according to four different options of a modular valve system according to an exemplary embodiment of the present invention.
Figure 1:
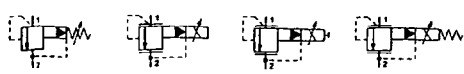
Figure 2:
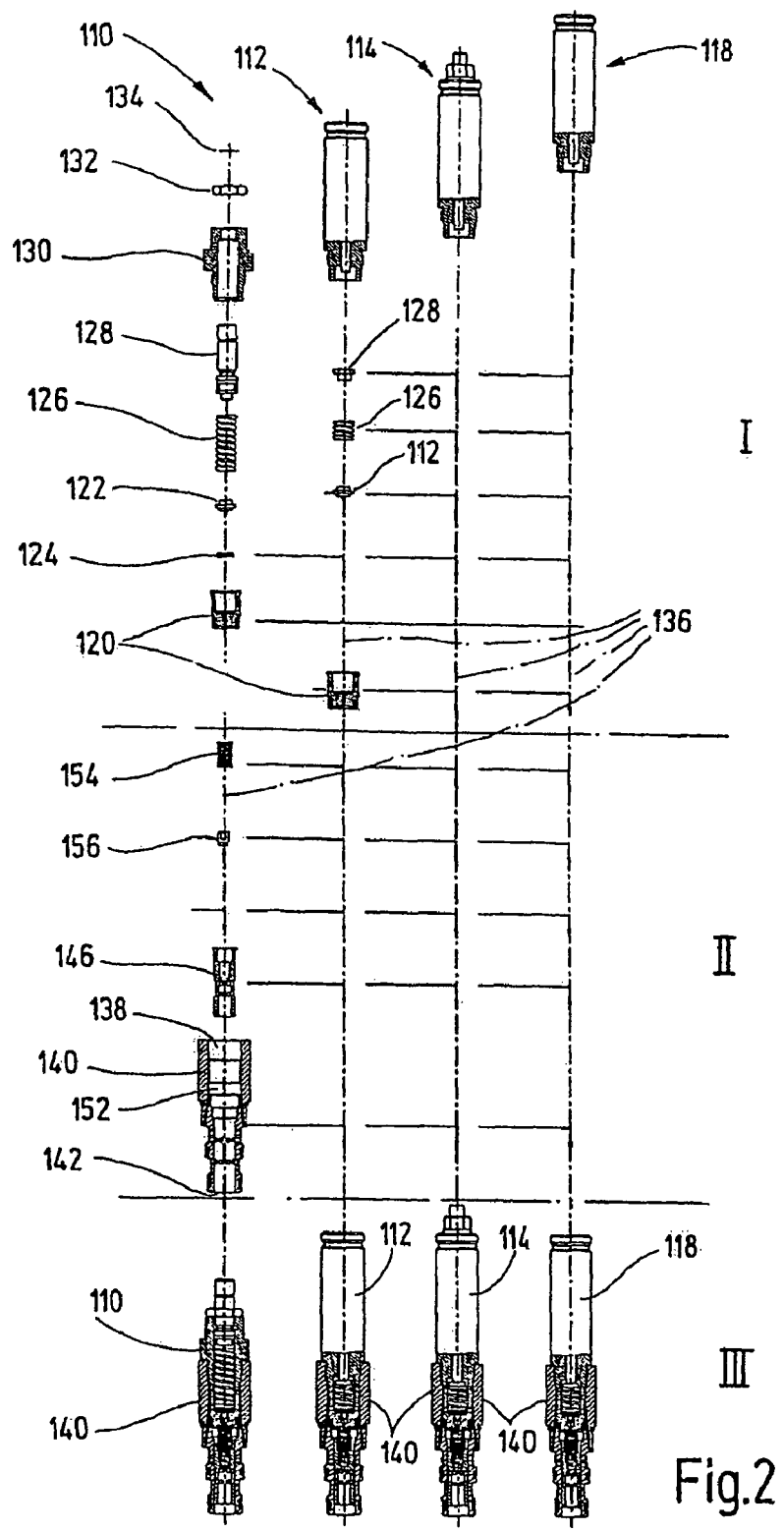
FIG. 2 presents side elevational views in section illustrating four different structures of a pilot-controlled pressure control valve with pre-assigned rated values according to four different options of a modular valve system according to another exemplary embodiment of the present invention.

The configuration of FIGS. 1 and 2 is such that the respective pilot control stage in the form of a pilot valve is illustrated in section I, the pilot control stage in the form of the primary valve proper is illustrated in section II, and the complete valve including stages I and II, along with the valve switching symbol customary in the literature is illustrated in section III. All the components shown in FIG. 1 are those of a pressure relief valve. All the components shown in FIG. 2 those of a pressure control or pressure reduction valve.

All the pilot valves illustrated in I are identical both in the embodiment shown in FIG. 1 and the embodiment in that shown in FIG. 2. A manually operated pilot valve 10, an electrically operated pilot valve in the form of a proportional magnet 12, a proportional magnet 14 with emergency pressure actuation 16, and a proportional magnet 18 with an inverted characteristic curve relative to embodiments 12, 14 are shown from left to right as viewed in each of FIGS. 1 and 2.

The manually operated pilot valve 10 has a valve seat 20 and a valve element 22. The valve element 22 rests against an energy accumulator in the form of a pressure spring 26. The closing force of spring 26 may be assigned or adjusted by a resetting element 28 and is guided in an adjustment housing 30. The closing force may be assigned or set manually by a hexagonal head screw 32 with retaining ring 34. Such manually adjustable pilot valves 10 are of the state of the art or conventional, and accordingly will not be described in detail.

If the individual components referred to are completed along the assembly line 36, the pilot valve as completed may be screwed into one end 38 of the valve housing 40. Another energy accumulator in the form of a pressure spring 44 is introduced from the other end 42 of the valve housing. On one end of valve housing 40, the main piston 46 rests. On the other end of valve housing 40 there rests on a multipart closing element 50 which may be screwed into the lower free end 42 of the valve housing 40. To this extent the primary control stage II and thus the primary valve proper is standardized in the form of a pressure relief valve. As the other assembly lines 36 demonstrate, appropriately modified pressure springs 26 and resetting elements 28 are used, while the valve elements 22 and pilot chambers 20 remain unchanged to obtain modified pressure relief valves having appropriately modified pilot control stages I in the versions indicated on different switching magnets 12, 14, and 18.

The pressure relief valves shown in section III having the customary switching symbol reproduced on their lower side on the basis of their characteristics may be obtained. If the complete total valve of section III is to be used under the modular valve system of the present invention to control a different fluid volume stream, the rated values at the valve housing 40 are to be correspondingly modified, especially with respect to the interior and circumferential side at the opposite ends 38 and 42 and with respect to the housing interior 52.

As is shown in FIG. 2, the structure of the pilot pressure control valve is selected accordingly. In particular, the pilot control stage I is essentially the same as that of the pilot control stage I in FIG. 1. In the manually operated pilot valve 110 another energy accumulator in the form of the pressure spring 154 engaging the opposite side of the pilot chamber 120 is added in addition to the energy accumulator in the form of the pressure spring 26. The structure in question is of the state of the art or conventional and will not be discussed in detail at this point. In addition, to the extent that the components in the modified embodiment in FIG. 2 correspond to the valve design shown in FIG. 1, the same reference numbers are used with each increased by 100. What has been stated also applies to this extent to the embodiment of a pressure control valve as shown in FIG. 2.

In contrast to the pressure relief valve of FIG. 1, in the embodiment shown in FIG. 2 the control piston 146 has a nozzle element 156. In other respects, the valve housing 140 is adapted with respect to its fluid connections to the functions to be performed by a pressure control valve. The valve housing 140 with its structural valve components is to be adapted to the extent that the fluid flows to be controlled vary with respect to volume and/or pressure. As a rule, however, the same pilot control stages indicated in FIG. 1 are employed in the valve design illustrated in FIG. 2.

The average expert in the field of valve technology may find it surprising that he can employ only a few basic components to develop a multiplicity of valve designs with different rated values without the need for developing his own structure on each occasion. The modular valve system of the present invention permits configuration of each valve obtained as a screw-in cartridge. Both the pressure relief valves and the pressure control valves may then be fastened on other structural components, such as ones in the form of a valve block in an all-hydraulic system.

While various embodiments have been chosen to illustrate the invention, it will be understood by those skilled in the art that various changes and modifications can be made therein without departing from the scope of the invention as defined in the appended claims.

What is claimed is:

1. A modular valve system, comprising:
at least one valve housing having first and second opposite ends with standard interior and exterior circumferences and standard interiors;
modular valve components mounted in said housing, said valve components including a valve piston, at least one energy accumulator, a pilot control element and at least one fluid connection, said valve components forming at least one of a pressure relief valve and a pressure control valve with said housing with each valve having a pilot valve as said pilot control element; and
a threaded connection on said housing allowing fastening of said housing as a screw-in cartridge to other structural components.

2. A modular valve system according to claim 1 wherein said pilot valve is manually operable.

3. A modular valve system according to claim 1 wherein said pilot valve is electrically operable.

4. A modular valve system according to claim 3 wherein said pilot valve comprises switching magnets for actuation thereof.

5. A modular valve system according to claim 4 wherein said switching magnets are proportional magnets.

6. A modular valve system according to claim 5 wherein said proportional magnets have an inverted switching pattern.

7. A modular valve system according to claim 5 wherein said pilot valve comprises a manual actuator.

8. A modular valve system according to claim 1 wherein said valve components and said housing form a pressure relief valve with said valve piston being a main piston engaged on a first end thereof by a pressure spring in said housing and longitudinally displaceable in said housing; and
said main piston is retained on an opposite second end thereof facing away from said pilot vale by a closing element in said housing.

9. A modular valve system according to claim 1 wherein said valve components and said housing form a pressure control valve with said valve piston being a control piston integrated with a nozzle; and
said control piston is engaged with said pilot valve by a pressure spring and is guided for longitudinal movement in said housing.

* * * * *